United States Patent
Guthrie et al.

(10) Patent No.: US 11,897,626 B2
(45) Date of Patent: Feb. 13, 2024

(54) SYNOPTICS SYSTEM OF AN ELECTRIC AIRCRAFT

(71) Applicant: BETA AIR, LLC, South Burlington, VT (US)

(72) Inventors: Charles Camron Guthrie, South Burlington, VT (US); Thomas Henck, South Burlington, VT (US)

(73) Assignee: BETA Technologies, Inc., South Burlington, VT (US)

( * ) Notice: Subject to any disclaimer, the term of this patent is extended or adjusted under 35 U.S.C. 154(b) by 0 days.

(21) Appl. No.: 17/853,012

(22) Filed: Jun. 29, 2022

(65) Prior Publication Data
US 2024/0002067 A1    Jan. 4, 2024

(51) Int. Cl.
*B64D 45/00* (2006.01)
*G06F 3/147* (2006.01)
*B64C 19/00* (2006.01)
*B64C 29/00* (2006.01)

(52) U.S. Cl.
CPC .............. *B64D 45/00* (2013.01); *B64C 19/00* (2013.01); *G06F 3/147* (2013.01); *B64C 29/0008* (2013.01)

(58) Field of Classification Search
CPC ..................................................... B64D 45/00
See application file for complete search history.

(56) References Cited

U.S. PATENT DOCUMENTS

| | | | |
|---|---|---|---|
| 9,114,887 B2 * | 8/2015 | Wischmeyer | G09B 5/02 |
| 9,710,145 B2 | 7/2017 | Zammit-Mangion et al. | |
| 9,940,895 B1 * | 4/2018 | Klein | B64D 43/00 |
| 10,005,562 B2 | 6/2018 | Kneuper | |
| 10,407,180 B2 * | 9/2019 | Morellec | B64D 43/00 |
| 11,046,450 B1 | 6/2021 | Barber | |
| 11,117,653 B2 * | 9/2021 | Covington | B64C 27/68 |
| 2019/0265067 A1 * | 8/2019 | Watkins | B60K 37/06 |
| 2021/0245893 A1 * | 8/2021 | Yuksel | B64U 10/13 |
| 2022/0063431 A1 * | 3/2022 | Gurusamy | B60L 58/12 |
| 2022/0341754 A1 * | 10/2022 | Lin | G01C 23/005 |
| 2023/0002040 A1 * | 1/2023 | Covington | G01L 25/003 |

FOREIGN PATENT DOCUMENTS

EP    3936376 A1    1/2022

OTHER PUBLICATIONS

Conversy, Interaction-Oriented Programming for Cockpits and Controller Working Positions, (conference publication), Proceedings of the 10th European Congress on Embedded Real Time Software and Systems—ERTS 2020, Jan. 29, 2020, p. 1-4, Toulouse, France.

* cited by examiner

Primary Examiner — Michael A Berns
(74) Attorney, Agent, or Firm — Lee & Hayes, P.C.

(57) ABSTRACT

In an aspect, a system for displaying synoptic information is provided. A processor of the system may retrieve and/or receive operation data related to the use of a corresponding electric aircraft. Operation data may be displayed on a display of the system using one or more visual representations or audio presentations.

20 Claims, 5 Drawing Sheets

SYNOPTICS SYSTEM OF AN ELECTRIC AIRCRAFT

FIELD OF THE INVENTION

The present invention generally relates to the field of electric aircraft. In particular, the present invention is directed to a synoptics system of an electric aircraft.

BACKGROUND

Modern aircraft, such as vertical landing and takeoff aircraft (VTOL) may include a set of propulsors. Without knowing particular data related to an operation of an aircraft, such as propulsors, a user may have difficulty maneuvering the aircraft.

SUMMARY OF THE DISCLOSURE

In an aspect, a synoptics system is provided. The synoptics system includes a processor; a memory communicatively connected to the processor and configured to contain instructions configuring the processor to retrieve operation data, generate a visual representation of the operation data; a display communicatively connected to the processor and configured to display the visual representation of the operation data, and a user interface communicatively connected to the processor and display that is configured to receive a user input, wherein the user input comprises manipulating the visual representation displayed on the display.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
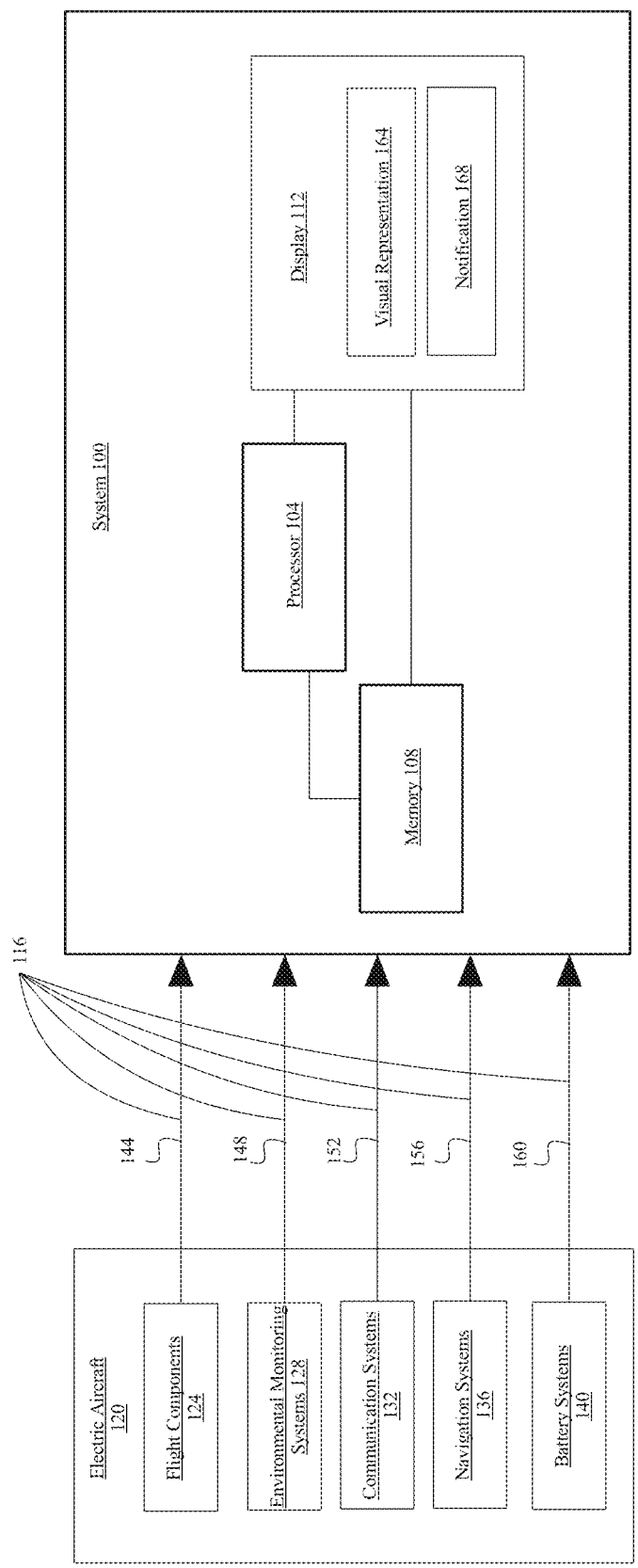
FIG. 1 is a block diagram of an exemplary embodiment of a synoptics system in accordance with one or more embodiments of the present disclosure.

Now referring to the drawings, FIG. 1 illustrates an exemplary embodiment of a synoptics system 100 in accordance with one or more embodiments of the present disclosure. In one or more embodiments, synoptics system 100 (also referred to herein as a "system") may include a digital primary flight display (PFD). In one or more embodiments, system 100 may be located in a cockpit of an electric aircraft. In other embodiments, system 100 may be remote to electric aircraft. In one or more embodiments, system 100 may include a processor 104. processor 104 may include a computing device. Processor 104 may be in communication with a computing device or be part of a computing device. Processor 104 may include any computing device as described in this disclosure, including without limitation a processor (e.g., processor 104), control circuit, microcontroller, microprocessor, digital signal processor (DSP), system on a chip (SoC), and the like. Computing device may include a computer system with one or more processors (e.g., CPUs), a graphics processing unit (GPU), or any combination thereof. In some embodiments, computing device may include a memory 108. In other embodiments, computing device and/or processor may be communicatively connected to and separately from memory 108. Memory 108 may include a memory, such as a main memory and/or a static memory, as discussed further in this disclosure below. In some embodiments, computing device may include a display 112, as discussed further below in the disclosure. In other embodiments, computing device and/or processor may be separate and communicatively connected to display 112. In one or more embodiments, computing device may include, be included in, and/or communicate with a mobile device, such as a mobile telephone, smartphone, tablet, and the like. In one or more embodiments, computing device may include an electronic flight instrument system (EFIS) in a cockpit of an electric aircraft. Computing device may be part of or in communication with a glass cockpit or a round dial cockpit. Computing device may include a single computing device operating independently, or may include two or more computing devices operating in concert, in parallel, sequentially, or the like. Two or more computing devices may be included together in a single computing device or in two or more computing devices. Computing device may interface or communicate with one or more additional devices, as described below in further detail, via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks, as described below, across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of gauge and/or corresponding computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or a sequence of steps repeatedly until a desired outcome or commanded outcome is achieved. Repetition of a step or a sequence of steps may be performed iteratively and/or recursively using outputs of previous repetitions as inputs to subsequent repetitions, aggregating inputs, and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like. Division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes memory 108. Memory 108 may be communicatively connected to processor 104 and may be configured to store information and/or data related to system 100 and corresponding data, as discussed further below. In nonlimiting embodiments, memory 108 may include one or more memory devices to store data and information and/or data related to operation data 116 of electric aircraft 120. Memory 108 may include various types of memory for such information storage, such as EEPROM (Electrically-Erasable Read-Only Memory), flash memory, volatile memory, non-volatile memory, RAM (Random-Access Memory), ROM (Read-Only Memory), a disk drive, and the like. In various embodiments, processor 104 may be configured to execute software instructions stored on memory 108 to perform various methods, processes, or operations in the manner described in this disclosure. In one or more embodiments, memory 108 is communicatively connected to processor 104 and configured to contain instructions configuring processor 104 to process data from subsystems or devices, such as sensors of electric aircraft, or data from, for example, a database, as discussed further below in this disclosure. Memory 108 may be configured to store information and data related to operation data. In one or more embodiments, memory 108 may include a storage device, as described further in this disclosure below. In one or more embodiments, memory 108 may store a database such as a database related to electric aircraft and/or components thereof.

With continued reference to FIG. 1, in one or more embodiments, processor 104 may be configured to retrieve operation data 116. For the purposes of this disclosure, "operations data" is information related to the use of an electric aircraft. Operation data 116 may be datum or data related to various avionic systems of electric aircraft 120. For instance, and without limitation, avionic systems may include battery systems 140, such as power sources and auxiliary power unit systems and charging monitoring systems, propulsion systems, such as flight components 124, communication systems 132, external environment monitoring systems 128, navigation systems 136, and the like. In various embodiments, operation data 116 may include system data, such as propulsion data 144 related to flight components 124, battery data 160 related to battery systems 140, diagnostic data, notifications 168, such as alerts and recommendations, sensor data, management data, flight mode data related to flight components 124, environmental data 148 related to environmental monitoring systems 128, flight plan data 156 related to navigation systems 136, communication data 152, and the like. In some embodiments, system 100 may include a scanner to retrieve information. For example, scanner may include an employing scanner, such as a MEMS. In other embodiments, processor 104 may retrieve operation data 116 from one or more sensors, such as sensors associated with one or more of the avionic systems. In other embodiments, processor may retrieve operation data 116 from memory 108. In other embodiments, processor 104 may retrieve operation data 116 from a database, such as, for example, a third-party database. Operation data 116 may include raw data or processed data. Operation data 116 may be displayed in one or more formats of display 112. For example, operation data 116 may be displayed as a video, live feed, photograph, drawing, model, text, or an audio format. A user may select for the same operation data to be displayed in one or more formats, such as a table, a list, an image, an audio format, and the like.

In one or more nonlimiting embodiments, operation data 116 may include battery data 160, where battery data 160 includes information related to conditions and/or characteristics of one or more power sources of electric aircraft 120. For example, and without limitation, battery data may include a state of charge of a battery pack or modules of a battery pack, a charging speed of power source by a charging station, a temperature of power source, a current of power source, a voltage of power source, schematics of power source, such as how many modules or cells power source has, battery life, and the like. In various embodiments, a sensor may detect battery data. As used in this disclosure, a "sensor" is a device that is configured to detect an input and/or a phenomenon and transmit information and/or data related to the detection. Sensor may generate a sensor output signal, which transmits information and/or datum related to a sensor detection. A sensor output signal may include any signal form described in this disclosure, for example digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio. Additional disclosure related to collecting battery data and monitoring a condition of a battery pack of an electric aircraft can be found in U.S. patent application Ser. No. 17/529,653 entitled "AN ELECTRIC AIRCRAFT BATTERY PACK AND METHODS OF USE", U.S. patent application Ser. No. 17/529,447 entitled "A MODULE MONITOR UNIT FOR AN ELECTRIC AIRCRAFT BATTERY PACK AND METHODS OF USE", U.S. patent application Ser. No. 17/529,583 entitled "A PACK MONITORING UNIT FOR AN ELETRIC AIRCRAFT BATTERY PACK AND METHODS OF USE FOR BATTERY MANAGEMENT", and U.S. patent application Ser. No. 17/515,441, entitled "SYSTEM AND METHODS FOR PRECONDITIONING A POWER SOURCE OF AN ELECTRIC AIRCRAFT", each of which is incorporated by reference in their entirety.

In one or more embodiments, operation data may include propulsion data 144. Propulsion data is datum or data related to a condition or operation of one or more flight components of an electric aircraft. A flight component may include an aerodynamic control surface or propulsion assembly used to control an attitude of aircraft 120 and thus maneuver aircraft 120 through a medium, such as air. An aerodynamic control surface may include, for example and without limitation, a rudder, aileron, elevator, spoiler, flap, and the like. A propulsion assembly may include a rotor, propeller, and the like. A control surface and a propulsion assembly may be controlled by a user, such as a pilot, using a pilot control. A pilot control may include a pedal, wheel, lever, button, switch, and the like. Propulsion data may include information related to a propulsor rate, propulsor current, propulsor torque, propulsor state-of-health, propulsor temperature, control surface angle, electric aircraft attitude, engine state of a propulsion assembly, actuator state of a control surface, failure and/or fault detection, and the like. In some embodiments, a visual representation 164 of propulsion data may include a tachometer that measures and shows a working speed, such as revolutions per minute (RPM) of one or more propulsors of an electric aircraft, an angle of attack, thrust, torque, power consumption, angular velocity, climb rate, structural limitations of electric aircraft, environmental and/or external limitations surrounding electric aircraft that affect flight components, and the like. Additional disclosure related to flight components and the monitoring flight components of an electric aircraft can be found in U.S. patent application Ser. No. 17/702,069 entitled "DUAL-MOTOR PROPULSION ASSEMBLY" and U.S. patent application Ser. No. 17/404,614 entitled "SYSTEMS AND METHODS FOR REDUNDANT FLIGHT CONTROL IN AN AIRCRAFT", each of which is incorporated by reference in their entirety.

In one or more embodiments, a sensor may be used to generate propulsion data 144 for processor 104 to retrieve. In one or more embodiments, sensor 128 may include an encoder. An encoder may be configured to detect and determine a motion of motor of, for example, a propulsor od electric aircraft 120. For example, and without limitation, encoder may be a rotary encoder. In one or more exemplary embodiments, encoder is configured to determine a motion of motor and/or propulsor, such as a speed in revolutions per minute of motor. Encoder is configured to transmit an output signal, which may include feedback, to processor 104.

In one or more embodiments, propulsion data 144 may include a detected measurement, such as, for example, a direct reading of a speed or RPM of propulsor. Detected measurement may include measurements of other characteristics of propulsor that may be used by processor 104 to calculate other propulsion data and/or operation data. For example, a measurement of an actuation of a pilot control, such as a pushing of a throttle lever, may be used to identify an attitude of a control surface or a thrust of a propulsor. As previously mentioned, pilot control may include, for example and without limitation, a wheel, pedal, button, switch, knob, lever, stick, or any other device and or mechanism used by a pilot to control movement of electric aircraft 120 through a medium. In one or more embodiments, system 100 may present propulsion data 144, such as a rotational speed of one or more propulsor and/or motor or shaft operatively connected to propulsor, lift, torque, motor current, motor voltage, propulsor angle and/or tilt, and the like. In some cases, propulsion data 144 may include a unitless or proportional parameter, such as speed or throttle. In other cases, propulsion data 144 may include a pilot input position, such as an angular position on lift lever or throttle wheel, as previously mentioned above. In one or more embodiments, a sensor may include one or more shaft (rotary type) encoder, photoelectric (optical type) sensor, and/or magnetic rotational speed (proximity type) sensor to detect an RPM or rotational speed of motor and/or propulsor of electric aircraft 120.

In one or more embodiments, operation data 116 may include flight mode data. Flight modes may include flight operation modes of electric aircraft 120. A flight operation mode of electric aircraft may include conventional flight mode, transition flight mode, and the like. For the purposes of this disclosure, a "transition" is a change of a propulsion assembly between a vertical flight position to a horizontal flight position. In one or more embodiments, system 100 may be used on any aircraft capable of transitioning a flight mode (e.g., from hover to conventional flight, or vice versa). For example, aircraft may include an electric vertical takeoff and landing (eVTOL), a VTOL, a tilt rotor, a tiltwing, and/or a helicopter. Transition between flight modes of an electric aircraft may be consistent with disclosure of U.S. patent application Ser. No. 17/825,371 filed on May 26, 2022 and titled "AN APPARATUS FOR GUIDING A TRANSITION BETWEEN FLIGHT MODES OF AN ELECTRIC AIRCRAFT", all of which is incorporated by reference herein in its entirety.

In one or more embodiments, flight mode data may include pilot input data. Sensor 128 may be configured to detect pilot input from pilot control and/or controller 112. In one or more embodiments, a pilot control may include buttons, switches, or other binary inputs in addition to, or alternatively than digital controls about which a plurality of inputs may be received. Pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, at least aircraft command. A pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. The manipulation of a pilot control may constitute an aircraft command. A pilot control may be physically located in the cockpit of an aircraft or remotely located outside of the aircraft in another location communicatively connected to at least a portion of the aircraft. A pilot input and/or control may include a collective, inceptor, foot bake, steering and/or control wheel, control stick, pedals, throttle levers, or the like.

Operation data may also include communication data 152. Communication data may include verbal or visual information related to communication within electric aircraft or with a remote third-party, such as ground control or other aircraft. Communication data 152 may be retrieved via a wired or wireless communication link. Processor 104 may retrieve or receive communication data in video, audio, or text format. Communication data 152 may be displayed on display 112 as a visual representation 164 to a user. For example, and without limitation, a verbal communication from ground control may appear on display 112 a written message. A user, such as a pilot, may user graphic user interface to respond to the communication. For example, and without limitation, user may provide a verbal response to the visual message from a third-party that system 100 may record and then transmit using communication link. Display 112 may show a log of prior communications that user may scroll or move through using graphic user interface of system 100.

Operation data may also include flight plan data 156. Flight plan data 156 may include information related to a past, current, or intended trajectory of electric aircraft 120. In various embodiments, processor 104 may retrieve flight plan data from memory 108 and/or a database. In other embodiments, processor 104 may generate a flight plan based on user inputs, such as an intended destination of user, fly zones the user desires to avoid, stops between a takeoff location and destination location the user intends to make, and the like. Flight plan data may also include collision avoidance data. For example, and without limitation, display 112 may provide an alert that a current intended flight plan will result in a collision with another electric aircraft. In addition, an updated flight plan and/or trajectory of electric aircraft 120 may be recommended to user to avoid the anticipated collision. User may then interact with system 100, such as via display 112, to select or reject the recommended updated flight plan.

In one or more embodiments, system 100 includes a display 112. Display may include a plurality of displays. In other embodiments, display 112 may include a single display, such as, for example, a singular screen. In some embodiments, system 100 may include analog displays and/or components, with physical components, in addition to display 112. In other embodiments, display 112 may include any combination of various types of displays, as discussed further below. In some embodiments, display may have a flat screen. In other embodiments, display may include a curved screen, for example, a screen having an arcuate surface. For example, and without limitation, a curved screen may include a convex screen. In another example, and without limitation, a curved screen may include a convex screen. Processor 104, memory 108, display 112, and the like may be communicatively connected to each other. For the purposes of this disclosure, "communicatively connected" is a process whereby one device, component, or circuit is able to receive data from and/or transmit data to another device, component, or circuit. Communicative connection may be performed by wired or wireless electronic communication, either directly or by way of one or more intervening devices or components. In an embodiment, communicative connection includes electrically connecting an output of one device, component, or circuit to an input of another device, component, or circuit. Communicative connection may be performed via a bus or other facility for intercommunication between elements of a computing device. Communicative connection may include indirect connections via "wireless" connection, low power wide area network, radio communication, optical communication, magnetic, capacitive, or optical connection, or the like. In an embodiment, communicative connecting may include electrically connecting an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical connection, or the like.

In one or more embodiments, system 100 includes display 112, which is configured to display, present, indicate, and/or otherwise visually and/or verbally convey data and/or information related to electric aircraft 120. For example, and without limitation, display 112 may show information related to electric aircraft 120, such as, for example, battery data, flight plan data, flight mode data, communication data, and the like, as discussed further in this disclosure. In another example, and without limitation, information generated and/or received by processor 104 may be shown by display 112. In other examples, and without limitation, information stored in and provided by memory 108 may be displayed on display 112. In various embodiments, display 112 may be implemented with an electronic display screen and/or monitor. Exemplary embodiments of electronic display screen may include a cathode ray tube (CRT), light-emitting diode (LED), liquid-crystal display (LCD), an opaque screen, and the like. In various embodiments, display 112 may be implemented with a projection screen and/or display. For example, and without limitation, display 112 may include a head-up display, a projector screen, a pico-projection display, a retinal display, and the like. In one or more embodiments, display 112 may include a monochrome or color display. Display 112 may be suitable for presenting a user-viewable image of one or more visual representations related to generated and/or provided information discussed in this disclosure. In some embodiments, system 100 may also be shown on an existing display of an external and/or remote device, such as a remote computing device, laptop, desktop, mobile phone, tablet, electric aircraft 120 information display system, or any other devices that may receive flight transition information from processor, sensor, memory, a remote computing device, and the like, to present flight transition information to a user. In some embodiments, display 112 may receive and display data and/or information converted and/or generated from processor 104. In other embodiments, display 112 may receive and display collected data and/or information directly from sensor. In other embodiments, display 112 may receive and show data and/or information stored and retrieved from memory 108. Data and information from memory 108 may be transferred from memory 108 via processor 104. Display 112 may be configured to present, indicate, or otherwise convey images and or symbols, such as text, related to a flight transition of electric aircraft 120. Still referring to FIG. 1, display may have navigable menus and/or graphic user interfaces (GUIs). Display 112 may show manipulable information.

Display 112 may be a touchscreen and, thus, provide controls of system 100 using screen. In other embodiments, system 100 may include a user interface, such as a mechanical interface, with actuated components that are adapted to generate one or more user actuated input control signals. Controls may include one or more buttons, switches, sliders, joysticks, keyboard, pedals, rotatable knobs, a peripheral device, remote device, and the like, which allow a user to navigate an interface, such as a graphic user interface (GUI), displayed on display 112. For example, and without limitation, a user may use controls to toggle between various units of displayed information (e.g., miles per hour (mph), kilometers per hour (kph), revolutions per minute (RPM), and the like) or various menus of graphic user interface or various versions of displaying information (e.g., such as a data table or a schematic diagram).

In one or more embodiments, user interface may be adapted to be integrated as part of display 112 to function as both a user input device and a display device, such as, for example, a touch screen device adapted to receive input signals from a user touching different parts of a screen of display 112. Processor 104 may be configured to sense a user control input signal from user interface and respond to sensed control input signals received therefrom. In various embodiments, display 112 may be configured to receipt user input. For example, and without limitation, display 112 may include a touchscreen that may receive tactile input. In other embodiments, display 112 may receive user input through peripheral device input. For example, and without limitation, a keyboard. In other embodiments, display 112 may receive user input through verbal and/or audio commands. For example, and without limitation, a user may make a voice command for display 112 to show a schematic drawing, photograph, or video of an energy source of electric aircraft 120.

In one or more embodiments, system 100 may organize and display operation data 116 in visual representations or audio format. Operation data 116 may be displayed on display 112 in various ways. For example, operation data 116 may be displayed in a table, popup, map, image, and the like. Infographics may be used to present operation data, such as statistical infographics, informational infographics, timeline infographics, process infographics, geographic infographics, comparison infographics, hierarchical infographics, and the like. In one or more embodiments, an interactive menu may be presented on display 112, allowing a user to readily move through various screens, such as types of operation data and/or types of visual representations.

Still referring to FIG. 1, synoptics system 100 is configured to provide interactive data related to operation of electric aircraft, such as characteristics of electric aircraft and/or phenomenon related to an external environment of electric aircraft. In various embodiments, display 112 may show a user notification and/or alert. In some embodiments, an alert may include an unprompted display of information that processor 104 has determined requires attention from the user, such as a pilot of electric aircraft 120. In one or more embodiments, system 100 may include an alert component, which may be activated if, for example, operation data 116 is outside of a preconfigured threshold and/or range. For example, and without limitation, an alert may appear on display 112 if a state of charge of a power source of aircraft 120 is below a preconfigured threshold. In another example, and without limitation, an alert may be displayed on display 112 if aircraft 120 has deviated from a recommended flight plan. Alert component may include one or more visual components, audio components, haptic components, and the like. For example, and without limitation, alert component may include a haptic component where a user may feel a vibration in a pilot input in addition to a visual representation on display 112 when real-time data deviates outside of a recommended range by processor 104. In another example, and without limitation, display 112 or a light-emitting diode (LED) may flash to indicate to a user that the user is deviating from a recommended range. Haptic components may include mechanical vibrators, piezoelectric components, or other movable components for generating motion that alerts a user that a recommended range is being exceeded. Audio components may include one or more speakers. Light-emitting components may include one or more light bulbs, LEDs, at least a portion of display 112, and the like.

In one or more embodiments, display 112 may show visual representations of operation data such as an orientation, altitude, attitude, location, and the like of electric aircraft; environmental data, such as wind speed, atmospheric pressure, humidity, cloud ceiling, rain conditions, lighting, and the like; system data, such as temperatures, voltages, currents, and the like of one or more components of electric aircraft (e.g., power source, flight components, subsystems, and the like). Various visual representations for each operation datum or collection of operation data may be presented. For instance, the same information and/or data may be presented using one or more representations. For example, and without limitation, a global position of aircraft 120 may be shown on display 120 as a satellite image, topographic image, radar image, and the like. In some embodiments, a user may readily toggle between the various visual representations 164 as desired. For example, and without limitation, a user may user a graphic user interface of display 112 to change a first visual representation of a first operation data to a second visual presentation of the first operation data. In other embodiments, user may select various visual representations or operation data to be compared. For example, a user may provide pilot into graphic user interface for processor 104 to present a radar image and satellite image side-by-side on display 112 or overlay the images.

Figure 2:
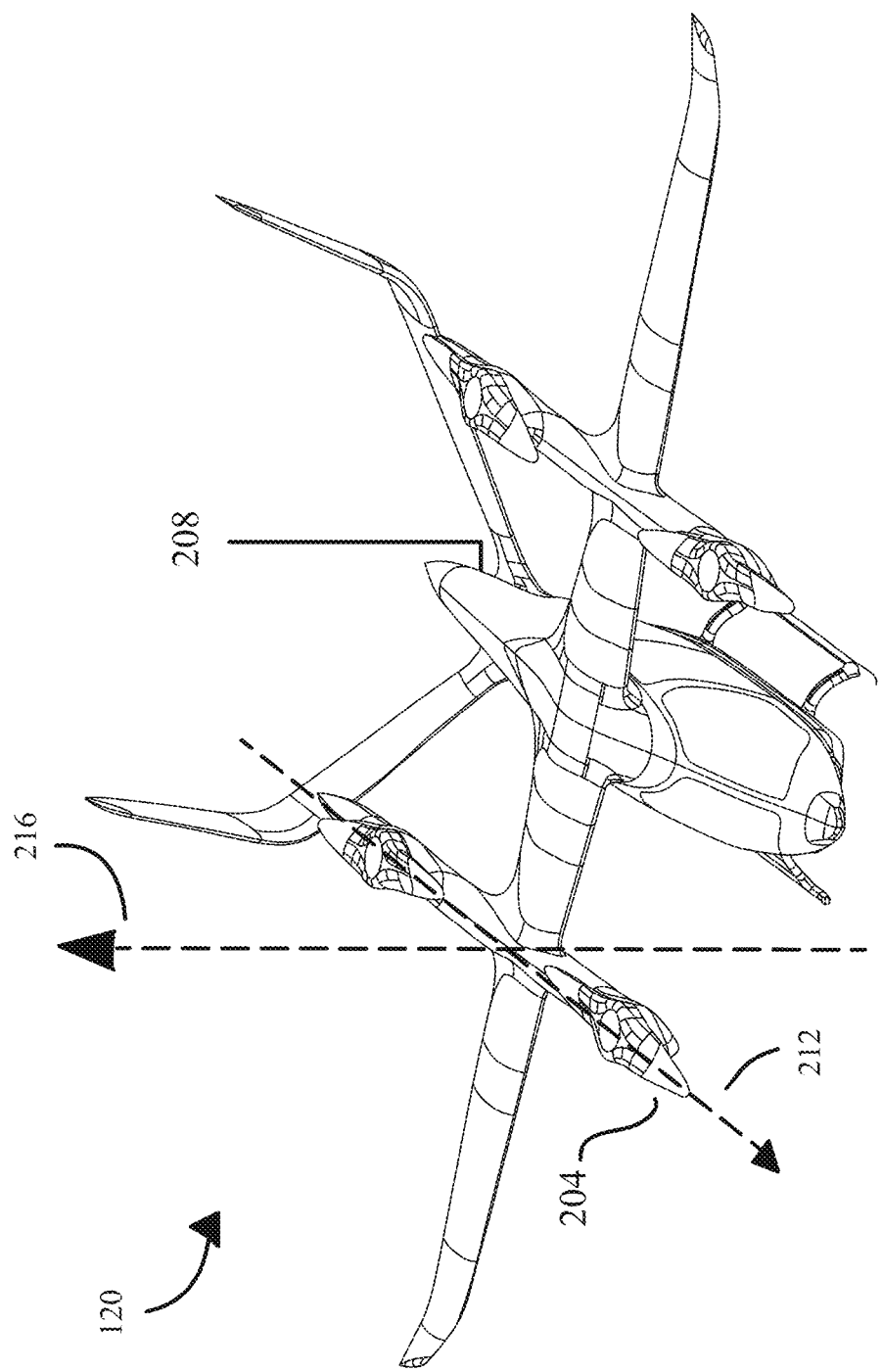
FIG. 2 is a schematic diagram of an exemplary embodiment of an electric aircraft in accordance with one or more embodiments of the present disclosure.

Referring now to FIG. 2, an illustration of an exemplary embodiment of aircraft 120 is shown. In some embodiments, aircraft 120 may include an electric aircraft. In some embodiments, aircraft 120 may include a vertical takeoff and landing aircraft (eVTOL). As used herein, a vertical take-off and landing (eVTOL) aircraft is one that may hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 2, a number of aerodynamic forces may act upon the electric aircraft 120 during flight. Forces acting on an aircraft 120 during flight may include, without limitation, thrust, the forward force produced by the rotating element of the aircraft 120 and acts parallel to the longitudinal axis. Another force acting upon aircraft 120 may be, without limitation, drag, which may be defined as a rearward retarding force which is caused by disruption of airflow by any protruding surface of the aircraft 120 such as, without limitation, the wing, rotor, and fuselage. Drag may oppose thrust and acts rearward parallel to the relative wind. A further force acting upon aircraft 120 may include, without limitation, weight, which may include a combined load of the electric aircraft 120 itself, crew, baggage, and/or fuel. Weight may pull aircraft 120 downward due to the force of gravity. An additional force acting on aircraft 120 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, aircraft 120 are designed to be as lightweight as possible. Reducing the weight of the aircraft and designing to reduce the number of components is essential to optimize the weight.

Referring still to FIG. 2, aircraft 120 may include at least a vertical propulsor 204 and at least a forward propulsor 208. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 204 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 2, at least a forward propulsor 208 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 104 and at least a forward propulsor 108 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

In some embodiments, aircraft 120 may be an eVTOL. In some embodiments, aircraft 120 may have one or more states, or modes, of operation and may transition between such modes of operation. Aircraft 120 may have a hover state. In a hover state, aircraft 120 may be moving through the air along a vertical path. In some embodiments, aircraft 120 may be in a hover state during liftoff operations. In another embodiment, aircraft 120 may be in a hover state in landing operations. In other embodiments, a hover state may be when aircraft 120 maintains an altitude when airborne. Aircraft 120 may use propulsors, such as vertical propulsor 204, to achieve ascent and descent in a hover state. In some embodiments, aircraft 120 may have a fixed-wing flight state. Aircraft 120 may be in a fixed-wing flight state during forward, backward, and sideways propulsion. A fixed-wing flight state may include edgewise flight. In some embodiments, aircraft 120 may have a first set of rotors for a hover state. In other embodiments, aircraft 120 may have a second set of rotors for a fixed-wing flight state. In some embodiments, aircraft 120 may use the same set of propulsors for both hover state and fixed-wing flight states.

In some embodiments, processor 104 may be configured to detect a plurality of flight operations of aircraft 120. In some embodiments, processor 104 may detect a change of aircraft 120 during a transition of aircraft 120 between a fixed-wing flight state and a hover state. For example, and without limitation, a magnetic element may be used to operably move rotor of propulsor. In some embodiments, rotor 116 and movement thereof may be as described in U.S. patent application Ser. No.: 16/938,952, filed Jul. 25, 2020, titled "INTEGRATED ELECTRIC PROPULSION ASSEMBLY", which is incorporated by reference herein in its entirety. In some embodiments, a rotor management system may be used to monitor an operation of electric aircraft such as a management system described in U.S. patent application Ser. No. 17/383,667, filed on Jul. 23, 2021, entitled "SYSTEM AND METHOD OF ROTOR MANAGEMENT," which is incorporated by reference herein in its entirety. In other embodiments, processor 104 may determine a minimal drag axis based on surrounding airflow of aircraft 120. A drag minimization axis and determining thereof may be as described in U.S. patent application Ser. No. 17/362,454 filed Jun. 29, 2021, titled "METHOD OF PROPULSOR MANAGEMENT IN ELECTRIC AIRCRAFT", which is incorporated by reference herein in its entirety.

Figure 3:
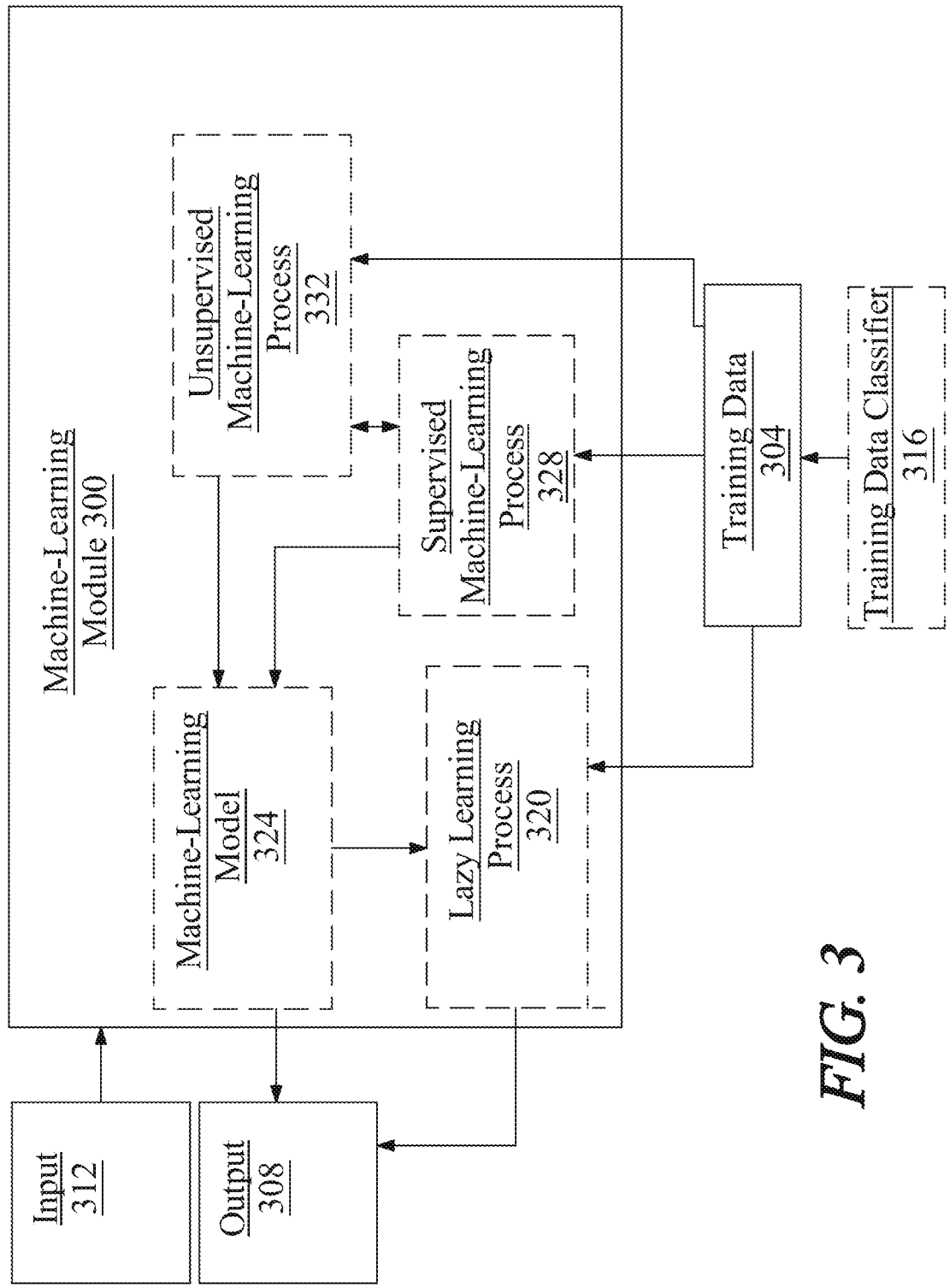
FIG. 3 is an exemplary embodiment of a machine-learning system in accordance with one or more embodiments of the present disclosure.

Referring now to FIG. 3, an exemplary embodiment of a machine-learning module 300 that may perform one or more machine-learning processes as described in this disclosure is illustrated. Machine-learning module 300 may be implemented in the determination of the flight states of the electric aircraft. Machine-learning module 300 may communicated with the flight controller to determine a minimal drag axis for the electric aircraft. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example flight elements and/or pilot signals may be inputs, wherein an output may be an autonomous function.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to sub-categories of flight elements such as torques, forces, thrusts, directions, and the like thereof.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
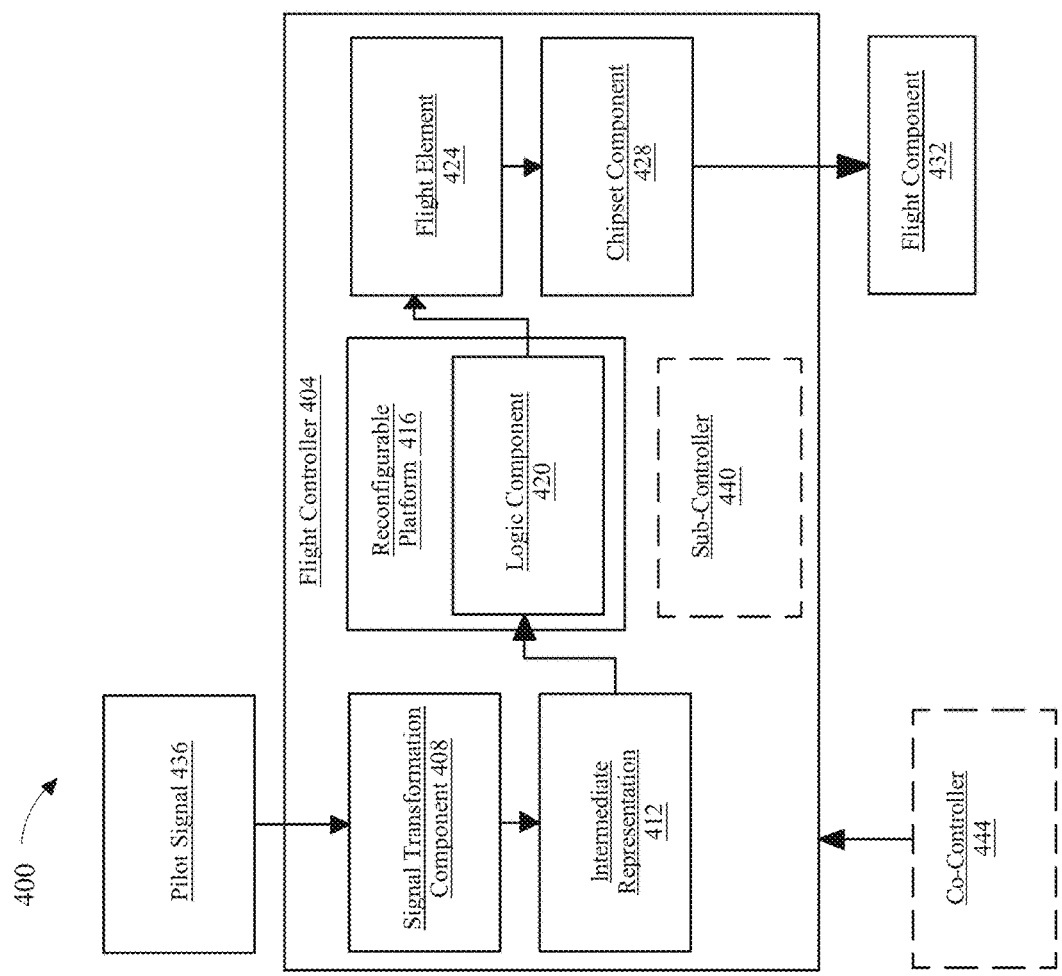
FIG. 4 is a block diagram of an exemplary embodiment of a flight controller system in accordance with one or more embodiments of the present disclosure.

Now referring to FIG. 4, an exemplary embodiment 400 of a flight controller 404 is illustrated. (Flight controller 124 of FIG. 1 and FIG. 2 may be the same as or similar to flight controller 404.) As used in this disclosure a "flight controller" is a computing device of a plurality of computing devices dedicated to data storage, security, distribution of traffic for load balancing, and flight instruction. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 416 may be reconfigured to enact any algorithm and/or algorithm selection process received from another computing device and/or created using machine-learning processes.

Still referring to FIG. 4, reconfigurable hardware platform 416 may include a logic component 420. As used in this disclosure a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 208. As used in this disclosure (and with particular reference to FIG. 4) a "flight component" is a portion of an aircraft that can be moved or adjusted to affect one or more flight elements. For example, flight component 208 may include a component used to affect the aircrafts' roll and pitch which may comprise one or more ailerons. As a further example, flight component 208 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, flight controller 404 may be configured generate an autonomous function. As used in this disclosure an "autonomous function" is a mode and/or function of flight controller 404 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 424. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 404 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 404 will control the ailerons and/or rudders. As used in this disclosure "non-autonomous mode" is a mode that denotes a pilot will control aircraft and/or maneuvers of aircraft in its entirety.

In an embodiment, and still referring to FIG. 4, flight controller 404 may generate autonomous function as a function of an autonomous machine-learning model. As used in this disclosure an "autonomous machine-learning model" is a machine-learning model to produce an autonomous function output given flight element 424 and a pilot signal 436 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, autonomous machine-learning model may include one or more autonomous machine-learning processes such as supervised, unsupervised, or reinforcement machine-learning processes that flight controller 404 and/or a remote device may or may not use in the generation of autonomous function. As used in this disclosure "remote device" is an external device to flight controller 404. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 4, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 404 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 4, flight controller 404 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 404. Remote device and/or FPGA may transmit a signal, bit, datum, or parameter to flight controller 404 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example, a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 404 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 208. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
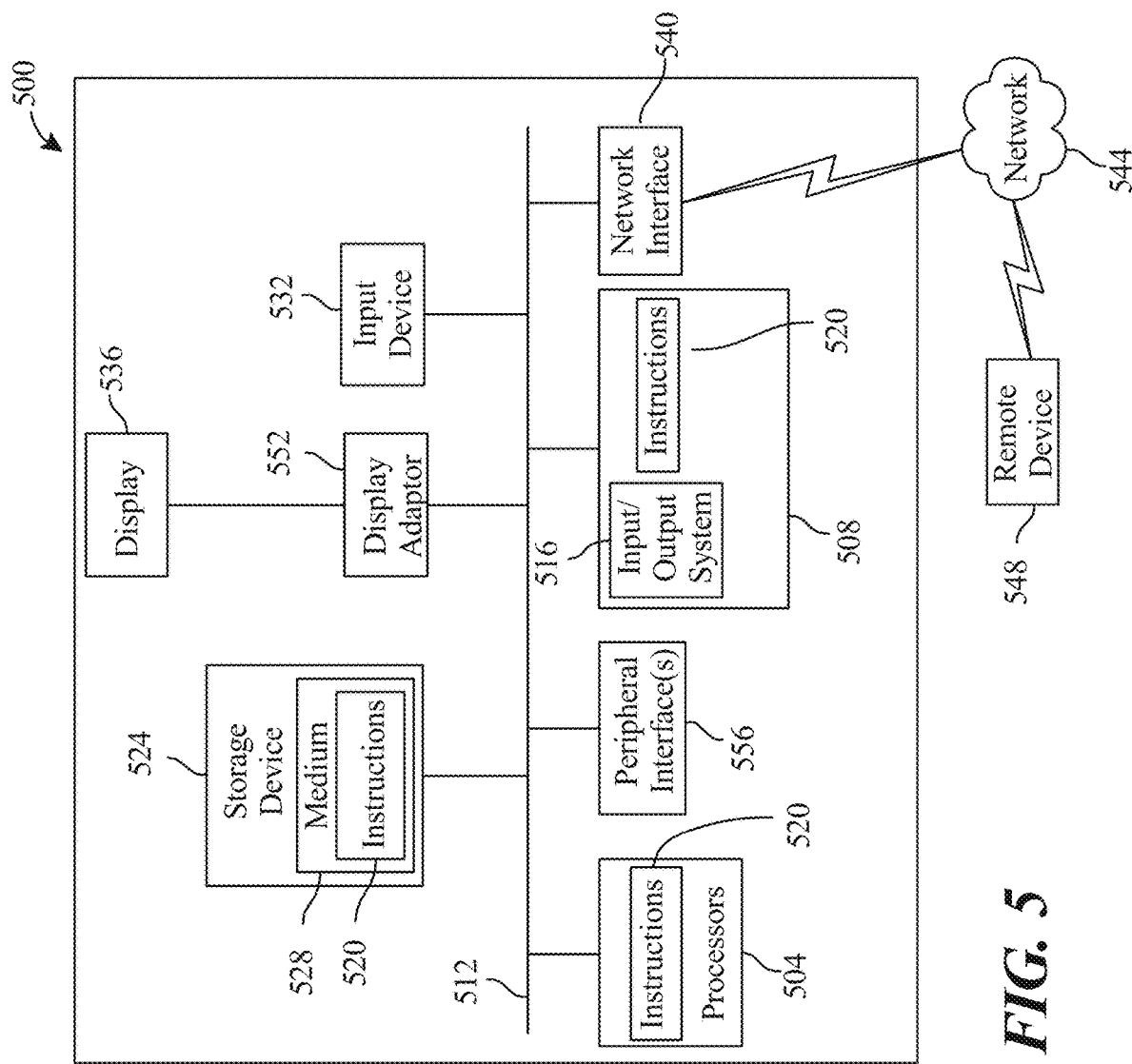
FIG. 5 is a block diagram of an exemplary embodiment of a computing system in accordance with one or more embodiments of the present disclosure.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A synoptic system of an electric aircraft, the system comprising:
   a processor;
   a memory communicatively connected to the processor and configured to contain instructions configuring the processor to:
      retrieve operation data, wherein the operation data comprises an angle of one or more propulsors of an electric aircraft during a transition between a hover state and fixed-wing flight state; and
      generate a visual representation of the operation data;
   a display communicatively connected to the processor and configured to display the visual representation of the operation data;
   a user interface communicatively connected to the processor and display that is configured to receive a user input, wherein the user input comprises manipulating the visual representation displayed on the display; and
   a haptic component configured to provide feedback to a user when the operation data deviates outside of a recommended range.

2. The system of claim 1, wherein retrieving the operation data comprises retrieving the operation data from a database.

3. The system of claim 1, wherein the retrieving the operation datum comprises retrieving the operation data from a sensor.

4. The system of claim 1, wherein the visual representation comprises an image.

5. The system of claim 1, wherein the visual representation comprises text.

6. The system of claim 1, wherein:
   generating a visual representation includes generating a first visual representation and a second visual representation of operation data; and
   manipulating the visual representation comprises toggling between the first visual representation and the second visual presentation on the display.

7. The system of claim 1, wherein the system is further configured to generate an alert, wherein the alert comprises urgent visual information related to the operation data, and wherein the visual information is displayed by the display, and wherein the alert further comprises the haptic feedback provided to the user through the haptic component.

8. The system of claim 1, wherein the display is further configured to display an interactive menu, wherein the interactive menu includes at least a second operation data.

9. The system of claim 1, wherein the operation data comprises battery data.

10. The system of claim 1, wherein the operation data comprises environmental data.

11. The system of claim 1, wherein the display comprises a liquid-crystal display (LCD).

12. An electric aircraft, the aircraft comprising:
a flight component configured to maneuver the aircraft through a medium; and
a synoptic system, wherein the synoptic system comprises:
a processor;
a memory communicatively connected to the processor and configured to contain instructions configuring the processor to:
retrieve operation data, wherein the operation data comprises an angle of one or more propulsors of an electric aircraft during a transition between a hover state and fixed-wing flight state; and
generate a visual representation of the propulsion data;
a display communicatively connected to the processor and configured to display the visual representation of the propulsion data;
a user interface communicatively connected to the processor and display that is configured to receive a user input, wherein the user input comprises manipulating the visual representation displayed on the display; and
a haptic component configured to provide feedback to a user when the operation data deviates outside of a recommended range.

13. The electric aircraft of claim 12, wherein retrieving the propulsion data comprises retrieving the propulsion data from a sensor communicatively connected to the flight component.

14. The electric aircraft of claim 12, wherein the visual representation comprises text.

15. The electric aircraft of claim 12, wherein:
generating a visual representation includes generating a first visual representation and a second visual representation of propulsion data; and
manipulating the visual representation comprises toggling between the first visual representation and the second visual presentation on the display.

16. The electric aircraft of claim 12, wherein the system is further configured to generate an alert, wherein the alert comprises urgent visual information related to the operation data, and wherein the visual information is displayed by the display, and wherein the alert further comprises the haptic feedback provided to the user through the haptic component.

17. The electric aircraft of claim 12, wherein the display is further configured to display an interactive menu, wherein the interactive menu includes at least a second propulsion data.

18. The electric aircraft of claim 12, wherein the propulsion data comprises a revolutions per minute (RPM) measurement of an electric motor of the flight component.

19. The electric aircraft of claim 12, wherein the propulsion data comprises an angle of the flight component.

20. The electric aircraft of claim 12, wherein the display comprises a liquid-crystal display (LCD).

* * * * *